July 1, 1930.  A. KOWALSKY  1,769,144
CORN BINDER
Filed Oct. 27, 1927  5 Sheets-Sheet 1

Inventor.
Andrew Kowalsky.
By H.P. Doolen
Atty.

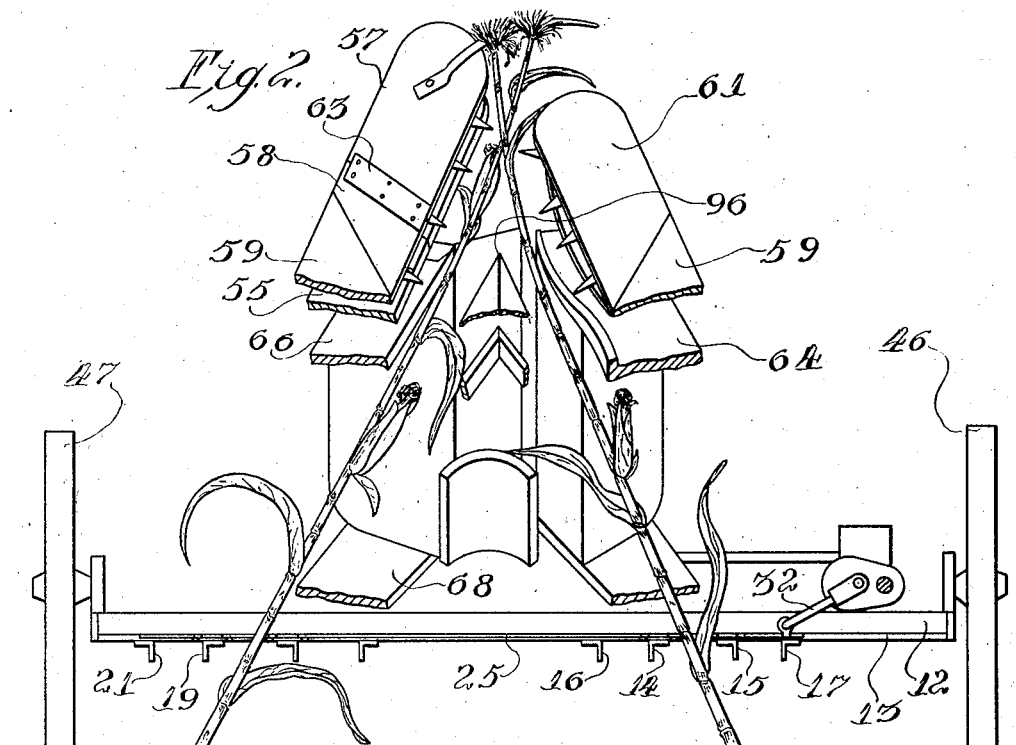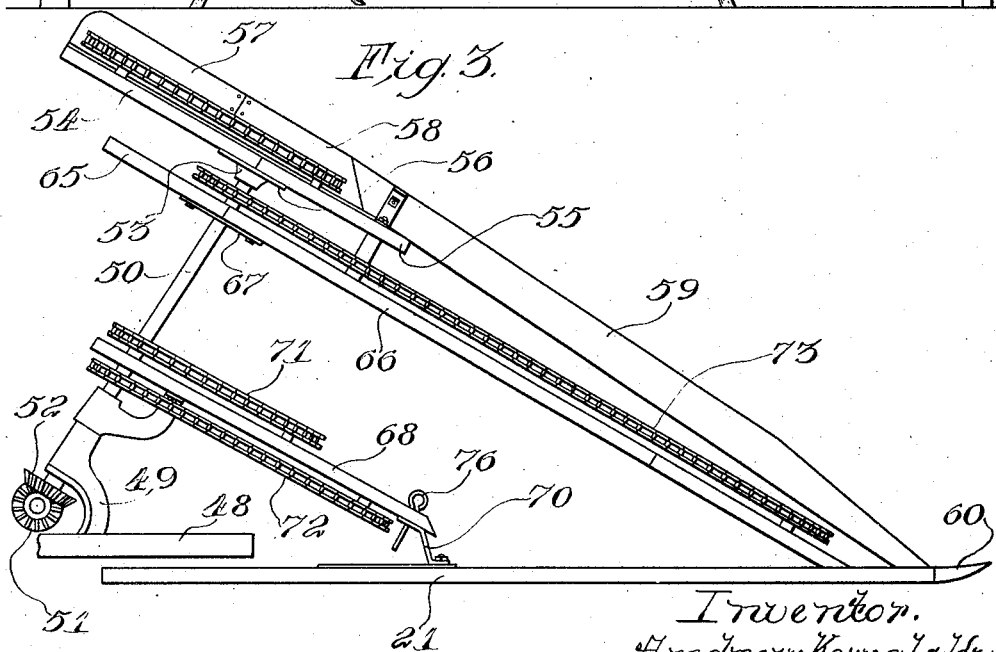

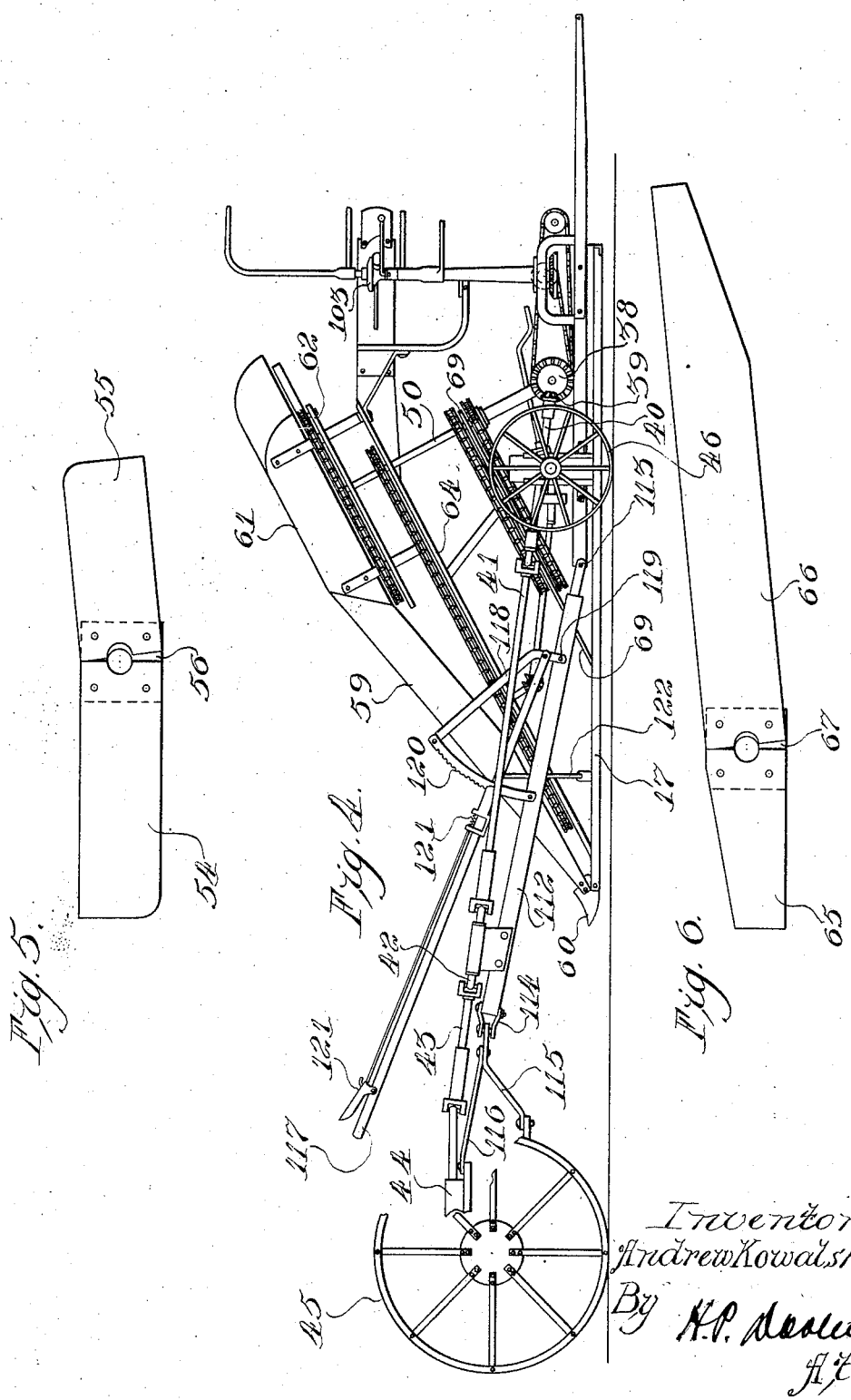

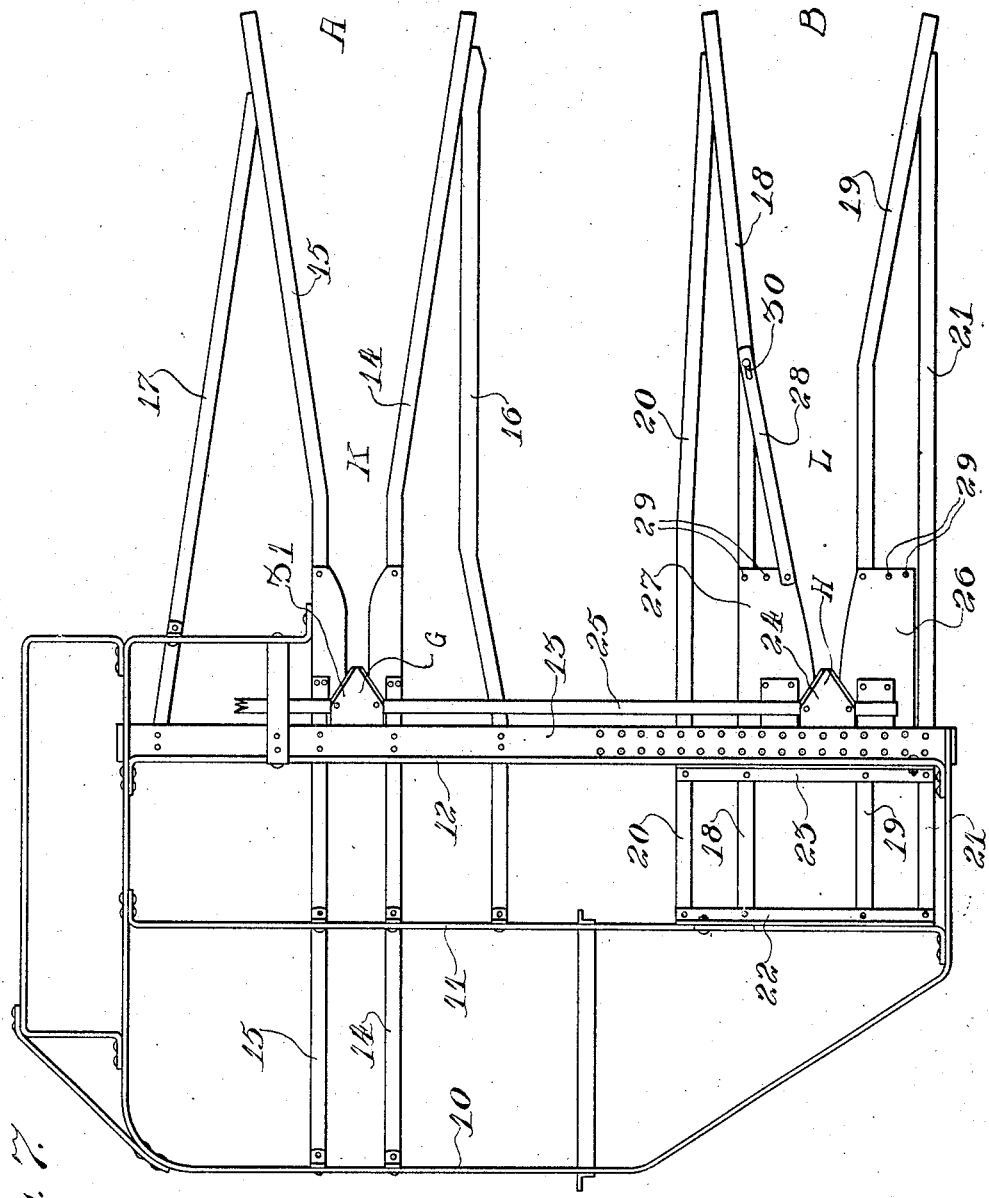

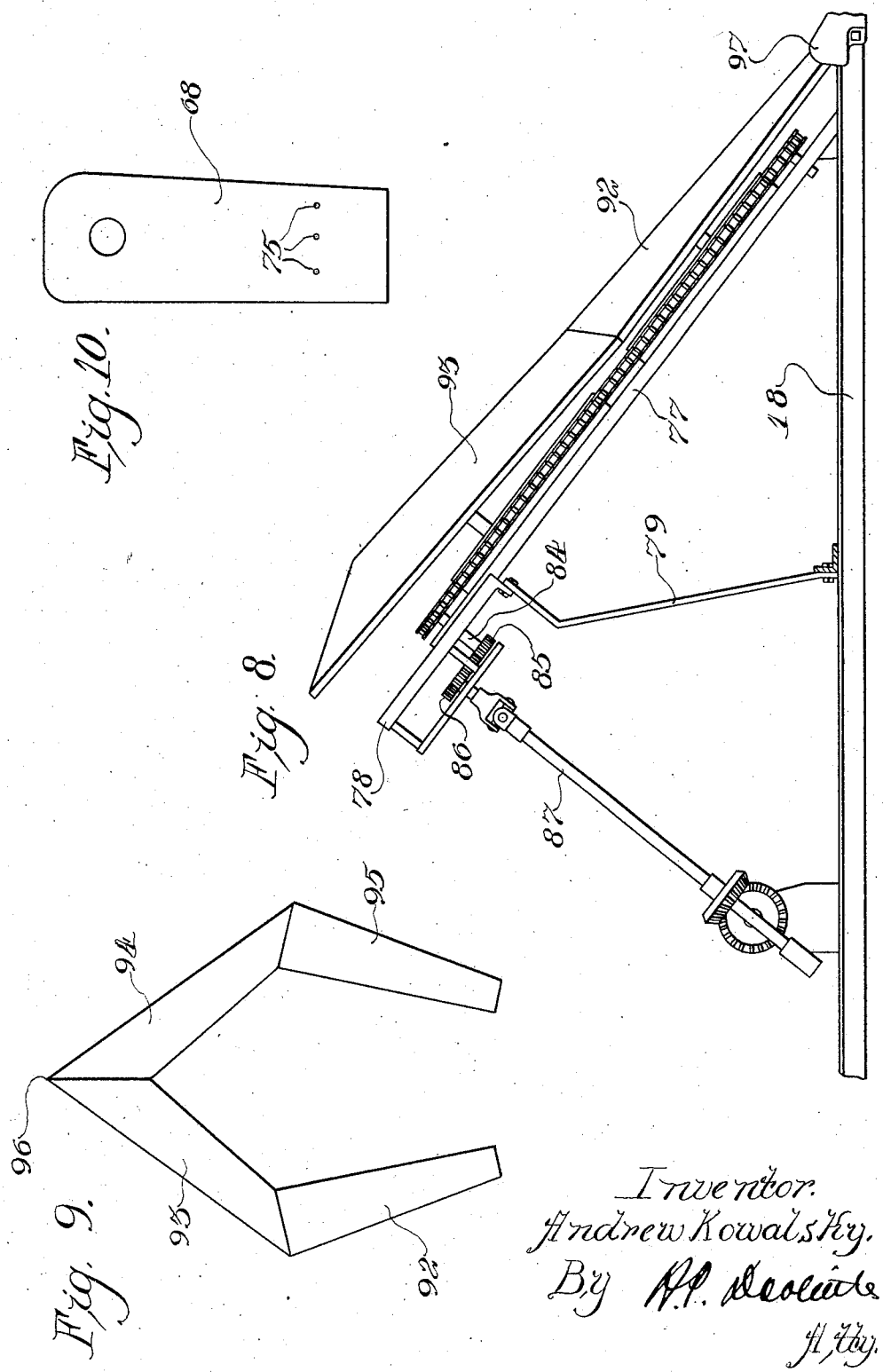

Patented July 1, 1930

1,769,144

UNITED STATES PATENT OFFICE

ANDREW KOWALSKY, OF OAK PARK, ILLINOIS, ASSIGNOR TO INTERNATIONAL HARVESTER COMPANY, A CORPORATION OF NEW JERSEY

CORN BINDER

Application filed October 27, 1927. Serial No. 229,029.

This invention relates to improvements in harvesters, and more particularly to a corn harvester having novel mechanism for advantageously cutting and binding corn.

An object of the invention is to provide a corn harvester having stalk gathering devices so associated with stalk cutting and binding mechanism as to materially reduce the cost of harvesting corn.

Another object of the invention is to provide an improved harvester in which a single binding mechanism can be made to do substantially twice the work which such binding mechanisms do upon known harvesters, and to do that work effectively without causing lost time due to breakdowns during harvest time.

Further objects of the invention will appear as the following description proceeds.

An illustrative harvester is shown in the accompanying drawings, in which:

Figure 2 is a diagrammatic vertical sectional view of the corn binder shown in Figure 1, illustrating the conditions of the stalks of two adjacent rows of corn as the cutters are about to sever the stalks near their bases;

Figure 3 is a side elevation of the gathering mechanism of the illustrative harvester;

Figure 4 is a side elevation of the entire harvester showing the draft hitches whereby it is operated by a tractor;

Figure 5 is a detail view of one of the upper exterior gatherer boards;

Figure 6 is a detail view of one of the middle exterior gatherer boards in plan;

Figure 7 is a plan of the base frame showing the arrangement of one fixed and one adjustable stalk cutting and stalk gathering unit;

Figure 8 is a side elevation of the inner or central stalk gatherer devices shown in Figure 1;

Figure 9 is a plan showing the arrangement of the stalk guides of the central gatherer device; and Figure 10 is a detail plan of the butt gatherer board 68.

Figure 1:
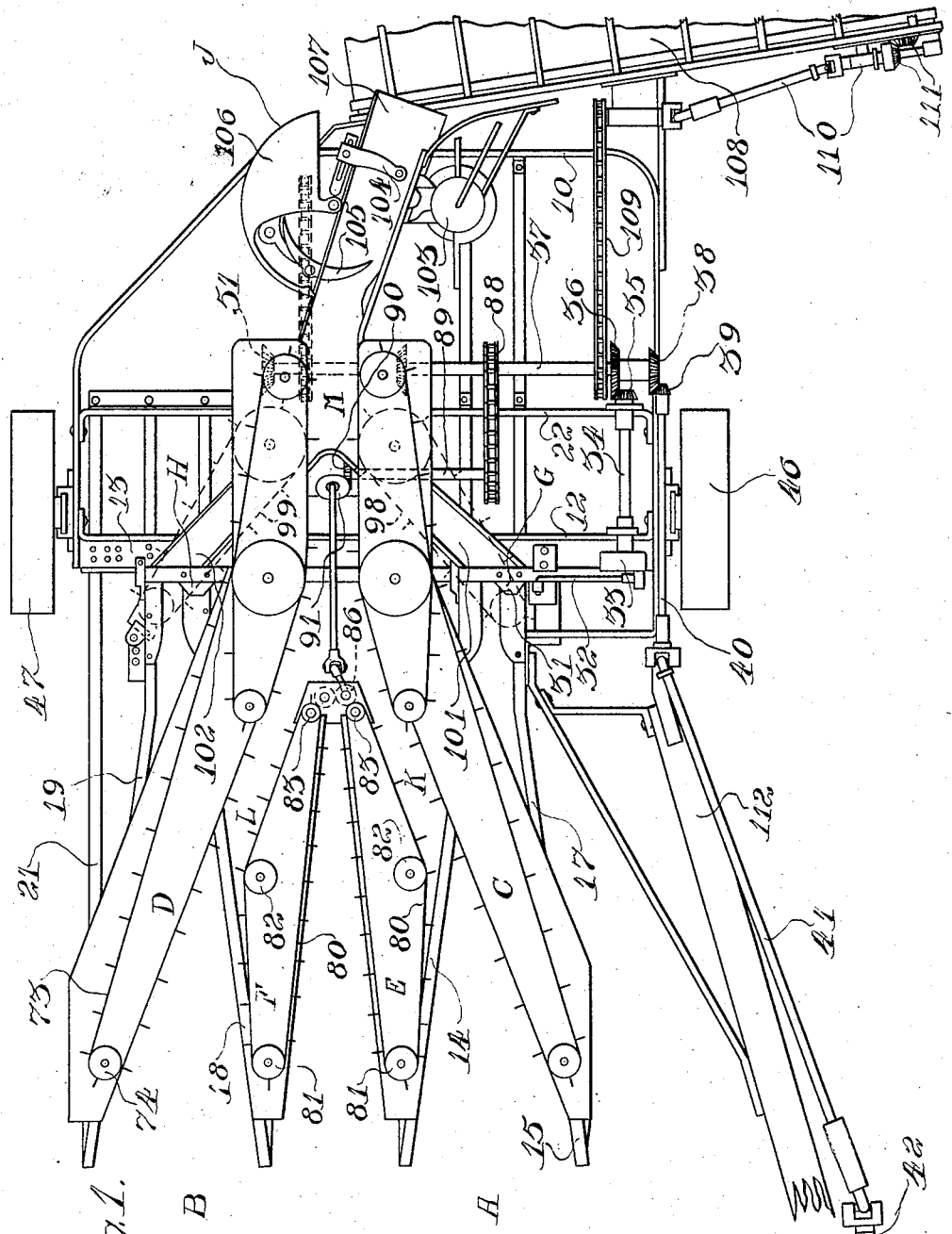
Figure 1 is a plan of the harvester as a two row corn binder.

In the illustrative harvester there are stalk cutting and stalk guiding units A and B. These units include stalk gatherers C, D, E and F. Improved stalk cutting action by the cutters G and H, and more effective stalk binding action by the binding mechanism J is caused by the shown arrangement of the gatherers C, D, E and F, which are convergent rearwardly. The stalk passages K and L formed by the gatherers merge in a position substantially midway of the cutters, but above their level. This relative positioning of the parts causes the stalks of two adjacent rows to be inclined before they are cut, as indicated in Figure 2 of the drawings. It also causes the tops of the stalks to become intertwined so as to enhance the operation of bundle forming.

The base frame upon which the stalk guiding, gathering and cutting devices and all operative parts of the machine are supported is shown in Figure 7. It includes transverse members 10, 11, 12 and 13 to which are secured the butt-guides 14 and 15 of the fixed cutting unit including the cutter G. These guides are forwardly divergent as shown, so as to bring the stalks of one row to the cutter G which operates between those guides. The guides are supported by forwardly extending braces 16 and 17 secured to the respective guides and to the transverse members of the base frame.

As different practices prevail in various countries as to corn growing, it is important that any practical corn harvester must be so adaptable that it will successfully meet the various conditions. In some countries the corn rows are as little as 28 or 30 inches apart, whereas in other countries the corn is planted in rows as far apart as 44 inches. Any practical and successful machine must take care of such varying conditions. In the harvester here shown the cutter unit H and its cooperating butt-guides 18 and 19 are adapted to be changed so as to act equally as well on wide apart corn rows as on closely spaced rows. One novel manner in which such a change may be effected will be described below.

Secured to the respective butt-guides 18 and 19 are struts 20 and 21. All of these members preferably extend across and underneath the frame bars 11 and 12 between which the angles bars 22 and 23 may be moved and guided. These angle bars extend across the members 11 and 12 as shown, and are preferably rigidly secured thereto. When it is desired to adapt the machine for action upon rows of maximum variation in spacing, the knife on section 24 is detached from the cutter bar 25 and the members 22 and 23 are detached from the bars 11 and 12. The whole stalk cutting unit is then moved the desired amount and resecured to its supports.

For adapting the machine for action upon rows of less variation in spacing, another structural feature is available. This includes the arrangement of the butt-guides 18 and 19 with a spacing greater than that of the similar guides 14 and 15. This will be evident when Figure 7 is inspected. The rear portion of the stalk passage L between guides 18 and 19 is narrowed by normally stationary members herein shown as fixed cutter plates 26 and 27. These plates are rigidly secured to the guides 18 and 19. As shown, the plate 27 projects inwardly of the guide 18, thereby reducing the stalk passage L. The oposing plate 26 has its forward inner corner directly above the inner edge of the guide 19. When the plates are thus arranged, a supplementary butt-guide 28 is employed leading from the inwardly extending part of the guide 18 to the inner front corner of the plate 27. The stalks are thus guided directly to the knife 24.

Each plate is provided with a number of perforations 29 in order that different row conditions may be met. The arrangement shown is for the wider rows. When slightly more narrowly spaced rows are encountered, the plates 26 and 27 are positioned so that the middle perforations of the plates are directly over their respective guides 19 and 18. The supplementary butt-guide 28 is slotted, as shown at 30, so as to take care of this arrangement which may be termed an intermediate positioning of the plates 26 and 27. When so positioned, a duplicate of the guide 28 is employed on the opposite side of the passage L to connect the plate 29 with the inwardly extending part of the guide 19. When the plates 26 and 27 are arranged for their narrow row adjustment, the latter is moved along the guide 18 until its inner front corner is directly above the inner edge of the guide. It is then in a position corresponding to the shown position of the plate 26. The latter is projected inwardly of the guide 19 and the supplementary guide is detached from the main guide 18 and secured to the opposite guide 19 at one end, and to the plate 26 at the other end. In any one of the described positions of the plates 26 and 27, it will be understood that the knife 24 is correspondingly moved along the cutter bar 25. The cutters 24 and 31 are preferably secured to the same bar 25 which is reciprocated by a train of power transmitting connections including the pitman 32, the crank wheel 33, the crank shaft 24, bevel gearing 35—36, main shaft 37, gearing 38—39, and consecutively connected shafts 40—41—42—43, the last of which is preferably driven by the power take-off 44 of a tractor 45. In case the implement is horse drawn instead of tractor operated, the power for driving the moving parts may be taken from a ground wheel adapted for the purpose and taking the place of one of the ground wheels 46 or 47 of the illustrated machine.

Coming now to a description of the other parts of the stalk guiding and moving devices, a good idea of their arrangement is to be obtained from Figures 1 and 3 of the drawings. Figure 3 is a side elevation showing the arrangement of the elements of the exterior stalk guides and stalk conveyers. Supported by a fixed part 48 of the frame is a bracket 49 in which is journaled the lower end of an upright shaft 50 driven by bevel gearing 51—52 from the main shaft 37. The shaft 50 is journaled at its upper end in a bearing 53 secured to top gatherer board sections 54 and 55 by the pivot plate 56. One of these sections is rigidly secured to a top guide shown as comprising the rigidly united sections 57, 58 and 59, the latter of which is rigidly secured to the butt-guide 21 by means of the stalk lifting shoe 60. This is the arrangement of parts on the right hand side of the harvester, looking in its direction of advance. On the other side of the machine, one top guide section 61 takes the place of two sections 57 and 58 on the other side, and a single piece top gatherer board 62 corresponds to the two sections 54 and 55 on the other side of the machine. The sections 57 and 58 are connected by junction plate 63 for permitting sections 58 and 59 to move outwardly when the adjustable butt-guides 18 and 19 and the cutter H are moved outwardly to take care of more widely spaced corn rows. The pivot plate 56 permits a similar adaptation of the top gatherer board comprising sections 54 and 55. Beneath the top guide sections 59 and 61 and the top gatherer board 62 on the left hand side of the machine is a middle gatherer board 64 secured at its lower end to the butt-guide 15 near its forward end. On the right hand side of the machine the corresponding middle gatherer board has two sections 65 and 66 connected by a pivot plate 67 through which the right hand upright shaft 50 passes. It is to be appreciated that it is only the exterior stalk guiding and moving devices which are now being specifically described. As shown in Figures 3 and 4, these devices include butt gathering units comprising butt gatherer boards 68 and 69 located respectively on the right and left hand sides of the harvester. The former has a bracket 70 for securing its lower end to the butt-guide 21, whereas the board 69 is preferably directly secured to its corresponding butt-guide 15.

Both exterior stalk guiding, gathering, and moving devices include stalk gatherer conveyors herein shown as sprocket chains having lugs for engaging and moving the corn stalks. All of these stalk gatherer chains are preferably driven by sprocket wheels fixed to the upright drive shafts 50. As the arrangements of these chains are substantially alike on the opposite sides of the machine, a description of the arrangement on one side will suffice. Considering the right hand side of the harvester as shown in Figure 3, there are butt-gatherer chains 71 and 72 located respectively above and below the butt-gatherer board 68. They are preferably supported so as to run substantially parallel to the board 68. Above the middle gatherer board 66 a long middle gather chain 73 operates. This chain extends downwardly and forwardly around a sprocket 74 located near the forward end of the butt-guide 21.

The butt-gatherer board 68 is adjusted transversely of the harvester by means of a series of holes 75 and a lift pin 76, the latter being shown in Figure 3 passing through the bracket 70.

The central stalk gatherer device, as shown in Figures 1, 8, 9 and 2 of the drawings, has central gatherer boards 77, which are generally rearwardly convergent. They are secured at their lower and forward ends to the butt-guides 14 and 18. At their rearward ends they are fastened to a support 78 held in position by a brace 79 secured to the butt-guides 14 and 18. Above each gatherer board 77 operates a gatherer chain 80 trained around three sprockets 81, 82 and 83, as shown in Figure 1 of the drawings.

The shafts 84 upon which the sprockets 83 are fixed are journaled in the support 78 and they extend downwardly therethrough, as shown in Figure 8 of the drawings. Beneath the support 78 spur pinions 85 are secured to the shafts 84. These pinions are in engagement with pinions 86, one of which is fixed upon the upright driving shaft 87 driven from the main shaft 37 through power transmitting connections including the sprocket chain 88, the counter-shaft 89, and bevel gears 90 and 91.

The outer edges of the gatherer boards 77 generally correspond with the outer edges of the guides 92, 93, 94 and 95 shown in Figure 9; that is, the outer edges of the latter elements are substantially directly above the outer edges of the gatherer boards 77. The relation of the guides 93 and 94 to the remainder of the stalk guiding and moving devices is shown in Figures 1 and 2, in which latter figure the rearwardly presented apex 96 of the guides is shown. The guides 92 and 95 terminate at their forward ends back of stalk lifting shoes 97 secured to the butt-guides 14 and 18. Rearwardly converging stalk conveyors 98 and 99 move the stalks toward the central stalk passage M through which the stalks pass to the bundle tying or binding mechanism J. Pans or troughs 101 and 102 support and guide the butts of the stalks as they are moved by the conveyors 98 and 99.

The structure of the binding mechanism J is of a known design having a knotter 103, a compressor 104, a needle 105, a breastplate 106 and a butt pan 107. The details of this mechanism form no part of the present invention aside from their arrangement relative to the other component parts of the harvester, and no more specific description of them will be here given.

As the bundles are ejected from the binding mechanism, they are transferred to one side of the machine by a bundle carrier 108 in the form of an endless conveyor driven from the main shaft 37 by suitable power transmitting connections, such as the sprocket chain 109, the shafting 110, and the gearing 111.

The binding mechanism is driven by suitable sprocket chains and gearing shown in the lower right hand part of Figure 4 of the drawings.

Figure 4 of the drawings shows the harvester attached to a tractor, the draft connections between the tractor and the harvester including a main draft bar 112 preferably pivoted to the harvester frame at 113. At its forward end, this bar is shown pivoted by a clevis 114 to tractor draft bars 115 and 116 preferably fixedly secured to the tractor 45.

For the purpose of raising and lowering the gatherer devices of the harvester, a control lever 117 is arranged within easy reach of the operator on the tractor, as shown in Figure 4 of the drawings. This lever is pivoted on an upright 118 secured to the main draft bar 112 at 119. A detent bar 120 connects the upper end of the upright with the draft bar, as shown. Hand controlled detent mechanism 121 mounted on the lever 117 locks the lever in any desired position. When the lever is moved, the stalk gatherers are correspondingly moved through the agency of a link 122 connecting the lever to base frame brace 17.

Although the invention has been described with reference to a particular machine, it is to be understood that the invention is not limited to the details of structure described, but is of a scope commensurate with the scope of the subjoined claims.

What is claimed as new is:

1. A multiple row corn binder comprising, in combination, a plurality of stalk cutters for simultaneously cutting the stalks of different rows, a single binding mechanism, and a plurality of rearwardly converging stalk guiding devices for guiding the stalks past the cutters and delivering them to the binding mechanism, said guiding devices converging rearwardly at positions in advance of the cutters.

2. A two row corn binder comprising, in combination, stalk cutters, stalk binding mechanism, and stalk guiding and moving devices forming two rearwardly converging stalk passages, said devices including two outside bodies and a central unit having rearwardly converging sides arranged between them, the stalk passages being formed by the outside bodies and the converging sides of the central unit.

3. A two row corn binder comprising, in combination, a wheel supported frame, stalk cutters carried by the frame and spaced apart, a distance corresponding to the distance between adjacent corn rows, stalk binding mechanism rearwardly of the stalk cutters, V-shaped exterior guides for engaging the outer sides of two rows of corn stalks and tilting the tops of the stalks toward each other before the stalks are severed by the cutters, interior guides arranged between the exterior guides with parts substantially parallel to the outer guides, and stalk conveyors associated with the guides for moving the stalks of two rows simultaneously to the common binding mechanism.

4. A two row corn binder comprising, in combination, a wheel supported frame, stalk cutters carried by the frame and spaced apart a distance corresponding to the distance between adjacent corn rows, stalk binding mechanism rearwardly of the stalk cutters, V-shaped exterior guides for engaging the outer sides of two rows of corn stalks and tilting the tops of the stalks toward each other before the stalks are severed by the cutters, interior guides arranged between the exterior guides with parts substantially parallel to the outer guides, the interior guides being joined at their rearward ends and terminating forwardly of the rearward ends of the exterior guides, and stalk gatherer chains associated with the guides.

5. In a two row corn binder, stalk cutting devices for simultaneously cutting the stalks of two rows of corn, and stalk conveying and guiding mechanisms converging rearwardly and forming stalk passages which merge substantially above the cutting devices.

6. A multiple row corn harvester comprising, in combination, a support, spaced stalk cutters carried by the support, a pair of forwardly diverging stalk guides carried by the support near one cutter and side of the harvester, a second pair of similar guides carried by the support near the other cutter and the outer side of the harvester, means uniting the guides of the second pair so that they may be moved as a unit relative to the support, and members carried by the support for serving as a guideway between the sides of which said means may be moved.

7. A multiple row corn harvester comprising, in combination, a support, spaced stalk cutters carried by the support, a pair of forwardly diverging stalk guides carried by the support near one cutter and side of the harvester, a second pair of similar guides carried by the support near the other cutter and the other side of the harvester, a wide guide-plate secured to each of the guides of said second pair of guides, one of said plates extending from its guide inwardly into the stalk passage between the guides of the second pair, and means for operating a cutter across the passage between said plates.

8. A multiple row corn harvester comprising, in combination, a support, spaced stalk cutters carried by the support, a pair of forwardly diverging stalk guides carried by the support near one cutter and side of the harvester, a second pair of similar guides carried by the support near the other cutter and the other side of the harvester, a wide guide-plate secured to each of the guides of said second pair of guides, one of said plates extending from its guide inwardly into the stalk passage between the guides of the second pair, and detachable means joining the forward inner margin of said extending plate to its supporting guide at a point on the latter forwardly of the extending plate.

9. A muliple row corn binder comprising, in combination, a plurality of stalk cutters for simultaneously cutting the stalks of different rows, a single binding mechanism, and a plurality of rearwardly diverging stalk guiding devices for guiding the stalks past the cutters and delivering them to the binding mechanism, said guiding devices converging rearwardly at positions in advance of the cutters and including sectional gatherer boards having parts pivotally mounted with respect to their remaining parts.

10. A two row corn binder comprising, in combination, stalk cutters, stalk binding mechanism, and stalk guiding and moving devices forming two rearwardly converging stalk passages, said devices including two outside bodies and a V-shaped unit arranged between them, the stalk passages being formed by the outside bodies and the rearwardly converging sides of the V-shaped unit, said bodies on one side of said unit having pivotally mounted sections.

11. A two row corn binder comprising, in combination, a wheel supported frame, stalk cutters carried by the frame and spaced apart a distance corresponding to the distance between adjacent corn rows, stalk binding mechanism rearwardly of the stalk cutters, V-shaped exterior guides for engaging the outer sides of two rows of corn stalks and tilting the tops of the stalks toward each other before the stalks are severed by the cutters, interior guides arranged between the exterior guides with parts substantially parallel to the outer guides, and stalk conveyors associated with the guides for moving the stalks of two rows simultaneously to the common binding mechanism, one of said exterior guides comprising pivotally adjustable sections.

12. A two row corn binder comprising, in combination, a wheel supported frame, horizontally reciprocating stalk cutters carried by the frame and spaced apart a distance corresponding to the distance between adjacent corn rows, stalk binding mechanism rearwardly of the stalk cutters, exterior guides including pivoted sections for engaging the outer sides of two rows of corn stalks and tilting the tops of the stalks toward each other before the stalks are severed by the cutters, interior guides arranged between the exterior guides with parts substantially parallel to the outer guides, the interior guides being joined at their rearward ends and terminating forwardly of the rearward ends of the exterior guides, and stalk gatherer chains associated with the guides.

13. In a two row corn binder, horizontally reciprocating stalk cutting devices for simultaneously cutting the stalks of two rows of corn, and stalk conveying and guiding mechanisms converging rearwardly and forming stalk passages which merge substantially above the cutting devices.

14. A multiple row corn harvester comprising, in combination, a support, spaced stalk cutters carried by the support, a pair of forwardly diverging stalk guides carried by the support near one cutter and side of the harvester, a second pair of similar guides carried by the support near the other cutter and the other side of the harvester, means uniting the guides of the second pair so that they may be moved as a unit relative to the support, and members carried by the support for serving as a guideway between the sides of which said means may be moved, one of said stalk guides comprising a fixed section and a section pivotally movable relative thereto.

15. A multiple row corn harvester comprising, in combination, a support, spaced horizontally reciprocating stalk cutters carried by the support, a pair of forwardly diverging stalk guides carried by the support near one cutter and side of the harvester, a second pair of similar guides carried by the support near the other cutter and the other side of the harvester, a wide guide-plate secured to each of the guides of said second pair of guides, one of said plates extending from its guide inwardly into the stalk passage between the guides of the second pair, means for operating a cutter across the passage between said plates, and a detachable guide link joining the forward inner marginal portion of said extending plate to its supporting guide at a point on the latter forwardly of the plate.

16. A multiple row corn harvester comprising, in combination, a support, horizontally reciprocating spaced stalk cutters carried by the support, a pair of forwardly diverging stalk guides carried by the support near one cutter and side of the harvester, a second pair of similar guides carried by the support near the other cutter and the other side of the harvester, a wide guide-plate secured to each of the guides of said second pair of guides, one of said plates extending from its guide inwardly into the stalk passage between the guides of the second pair, stalk moving devices above said guides forming two stalk passages rearwardly converging and merging at positions substantially directly above said cutters, and a detachable stalk guide bar joining the forward inner margin of said extending plate to its supporting guide at a point on the latter forwardly of the extending plate.

In testimony whereof I affix my signature.

ANDREW KOWALSKY.

CERTIFICATE OF CORRECTION.

Patent No. 1,769,144.                                     Granted July 1, 1930, to

ANDREW KOWALSKY.

It is hereby certified that error appears in the printed specification of the above numbered patent requiring correction as follows: Page 4, line 19, claim 3, after the word "apart" strike out the comma; same page, line 62, claim 6, for "outer" read other; and that the said Letters Patent should be read with these corrections therein that the same may conform to the record of the case in the Patent Office.

Signed and sealed this 21st day of October, A. D. 1930.

M. J. Moore, (Seal)                                                        Acting Commissioner of Patents.